United States Patent [19]

Lee

[11] Patent Number: 5,532,761
[45] Date of Patent: Jul. 2, 1996

[54] METHOD FOR AUTOMATIC RESERVATION TUNING FOR BROADCASTING RECEIVERS AND DEVICE THEREFOR

[75] Inventor: Changho Lee, Incheon, Rep. of Korea

[73] Assignee: Daewoo Electronics Co., Ltd., Seoul, Japan

[21] Appl. No.: 363,909

[22] Filed: Dec. 27, 1994

[30] Foreign Application Priority Data

Dec. 28, 1993 [KR] Rep. of Korea .................. 93-30445

[51] Int. Cl.⁶ ................................................ H04N 5/50
[52] U.S. Cl. ..................... 348/731; 348/569; 455/184.1
[58] Field of Search .................................. 348/734, 731, 348/569, 563, 906; 345/172, 26; 358/335; 455/181.1, 184.1, 186.2; H04N 5/50, 5/445

[56] References Cited

U.S. PATENT DOCUMENTS

| | | | |
|---|---|---|---|
| 4,403,344 | 9/1983 | Yamada et al. | 455/181.1 |
| 4,633,514 | 12/1986 | Fimoff et al. | 348/734 |
| 4,847,696 | 7/1989 | Matsumoto et al. | 358/335 |
| 4,959,720 | 9/1990 | Duffield et al. | 348/731 |

OTHER PUBLICATIONS

Taab et al, "Principles of Communication Systems", 1986, p. 411, Section 10.7, lines 1–14.

Primary Examiner—Safet Metjahic
Assistant Examiner—Jeffrey S. Murrell
Attorney, Agent, or Firm—Oliff & Berridge

[57] ABSTRACT

Disclosed is an automatic reservation tuning device which is automatically tuned to a reserved channel number in accordance with reservation information for a program reserved by a viewer. The device includes a reservation keypad for inputting reservation information, a character data storing unit for storing character data to be displayed on a CRT screen based on an input data by the reservation keypad, a character data output unit for outputting the character data signal of the reservation information, and a phase locked loop data output unit for automatically tuning a tuner to a reserved channel number by comparing the present and reservation information. The automatic tuning of the tuner to the reserved channel number can provide the viewer with convenience for watching a reserved program.

6 Claims, 5 Drawing Sheets

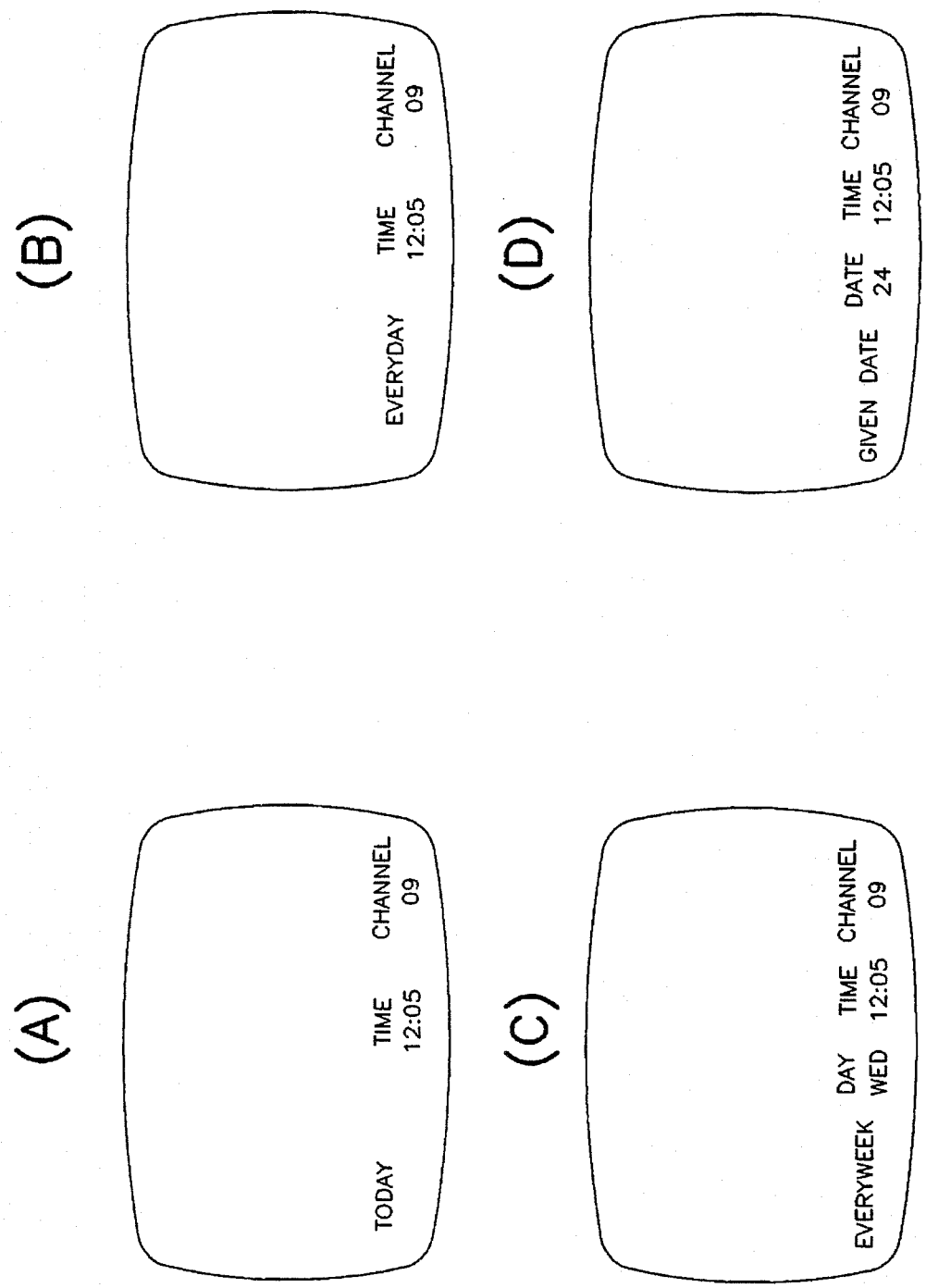

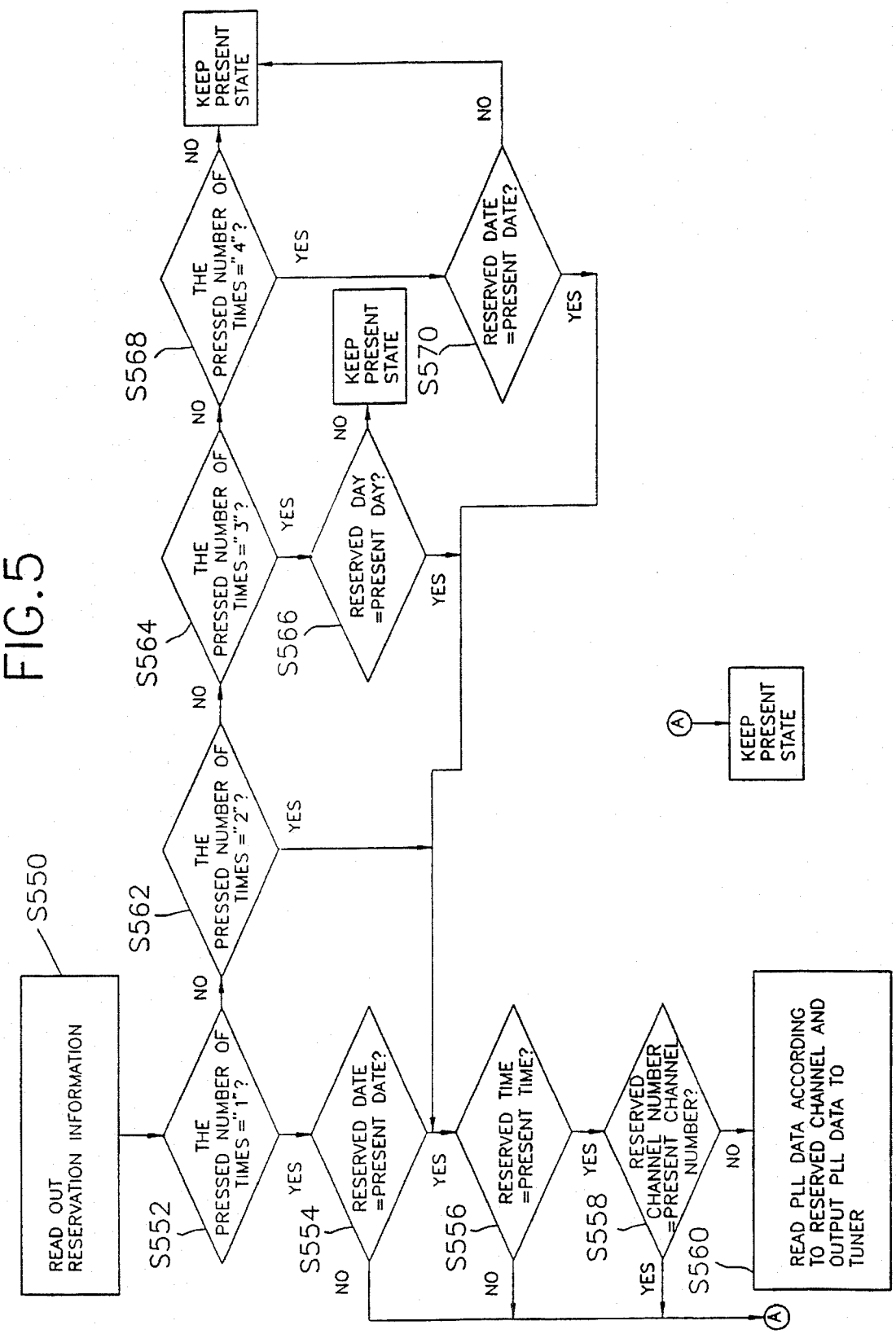

METHOD FOR AUTOMATIC RESERVATION TUNING FOR BROADCASTING RECEIVERS AND DEVICE THEREFOR

BACKGROUND OF THE INVENTION

1. Field of the Invention

The present invention relates to a method for automatic reservation tuning a broadcasting receiver and devices therefor and more particular, to a method automatic reservation tuning of a broadcasting receiver which can automatically be tuned based on reserved information contents of a desired program and a device for appropriately performing the same.

2. Description of the Prior Art

In general, broadcasting receivers such as a television set and the like receive broadcasting signals via multiple channels. A broadcasting signal of one these multiple channels is selected by tuning. Thus, a broadcasting receiver such as a television set should be tuned to a different channel number if a user wants to watch a different program to be broadcasted on the different channel instead of watching a present program. Then, when the user manually selects another channel number instead of a present channel number, he may miss the beginning portion of a desired program to be broadcasted on the different channel number.

Thus, in order to solve such an inconvenience, there has been proposed a broadcasting receiver having a reservation function whereby information concerning a channel number, date and time of desired program are reserved and then the broadcasting receiver is automatically tuned to a desired program according to the reserved information so that the user can watch the desired program.

Also, a video tape recorder, wherein a program preset code thereof such as G-code (Plus code) and the like is inputted for tuning a desired broadcasting signal and storing the pre-set program, is disclosed in European Patent Publication No. 589 369 (by Naoki Yonetani et al.). The recorder has an input unit for inputting the program pre-set code having information about a broadcasting station, date and time of a desired program. The program pre-set code is decoded to a pre-set data by a decoder. A teletext unit receives program lists having program confirmation codes, time and date of each program to be broadcasted within a predetermined time by the broadcasting station designated by the pre-set data. A checking unit checks the pre-set time and date to be compared with time and date of the program of the program lists. The setting unit sets the program confirmation code on a memory device corresponding to the program if that date and time of the program of the program lists are the same as time and date of the pre-set data. A recording unit records the program if the program confirmation code is the same as the program confirmation code set by the setting unit.

These video tape recorders may be automatically tuned to record the desired program even when a broadcasting time is changed by the broadcasting station. However, these video tape recorders have deficiencies of having a complicated construction.

SUMMARY OF THE INVENTION

It is an object of the present invention to provide a method for automatic reservation tuning for a broadcasting receiver.

It is another object of the present invention to provide a device for automatic reservation tuning for a broadcasting receiver.

To achieve the above objects of the present invention, the device for automatic reservation tuning for a broadcasting receiver includes:

an input unit for inputting reservation information on watching modes including today's watching, everyday watching, every week watching or given-date watching for desired broadcasting programs;

a memory unit for storing character data such as a date, time, a day of the week and a channel number to be displayed on a CRT screen according to the reservation information corresponding to each of the watching modes;

a unit for reading out the character data according to the reservation information corresponding to each of the watching modes selected from the memory unit and outputting a character data signal to an OSD/image signal processor to display the character data on the CRT screen; and a PLL data output unit for outputting to a tuner, the PLL data corresponding to a reserved channel number when a present channel number is different from the reserved channel number and for keeping outputting PLL data corresponding to the present channel number when the two reserved channel numbers are the same.

The input unit has a reservation selection key; a plus key for increasing a date, time, a day of the week and a channel number for reservation information; a minus key for decreasing a date, time, a day of the week and a channel number for reservation information; and an enter key for completing an input of the date, time, the day of the week and the channel number selected by the plus and minus keys.

Thus, a viewer can input desired items such as a date, time, a day of the week and a channel number as reservation information according to one selection of watching modes such as today's watching, everyday watching, every week watching or given-date watching. The reservation information selected by plus and minus keys is determined by pressing the enter key. The character data stored in the memory unit, which indicates necessary input items as reservation information on a selected watching mode, is displayed on the CRT screen. The present information such as the present date, the present time, the present day of the week and the present channel number is obtained from a timer conventionally used in a broadcasting receiver. A channel number of the reservation information is compared with that of the present information. If the two channel numbers are different from each other, the PLL data conforming to the reserved channel number is outputted to the tuner for being automatically tuned to the reserved channel number.

Thus, a device for automatic reservation tuning for a broadcasting receiver and a method therefor according to the present invention can provide a viewer with a great convenience for watching desired programs since a tuner can be automatically tuned to a reserved channel number.

BRIEF DESCRIPTION OF THE DRAWINGS

The above objects and other advantages of the present invention will become more apparent by describing in detail a preferred embodiment thereof with reference to the attached drawings in which:

FIG. 4 shows views for illustrating different display formats on the CRT screen during a reservation performance by a device for automatic reservation tuning for a broadcasting as shown in FIG. 2; and FIG. 5 is a flow chart for explaining automatic tuning processes for a device for automatic reservation tuning for a broadcasting receiver as shown in FIG. 2.

DESCRIPTION OF THE PREFERRED EMBODIMENT

A preferred embodiment of the present invention will be described in detail with reference to the accompanying drawings.

Figure 1:
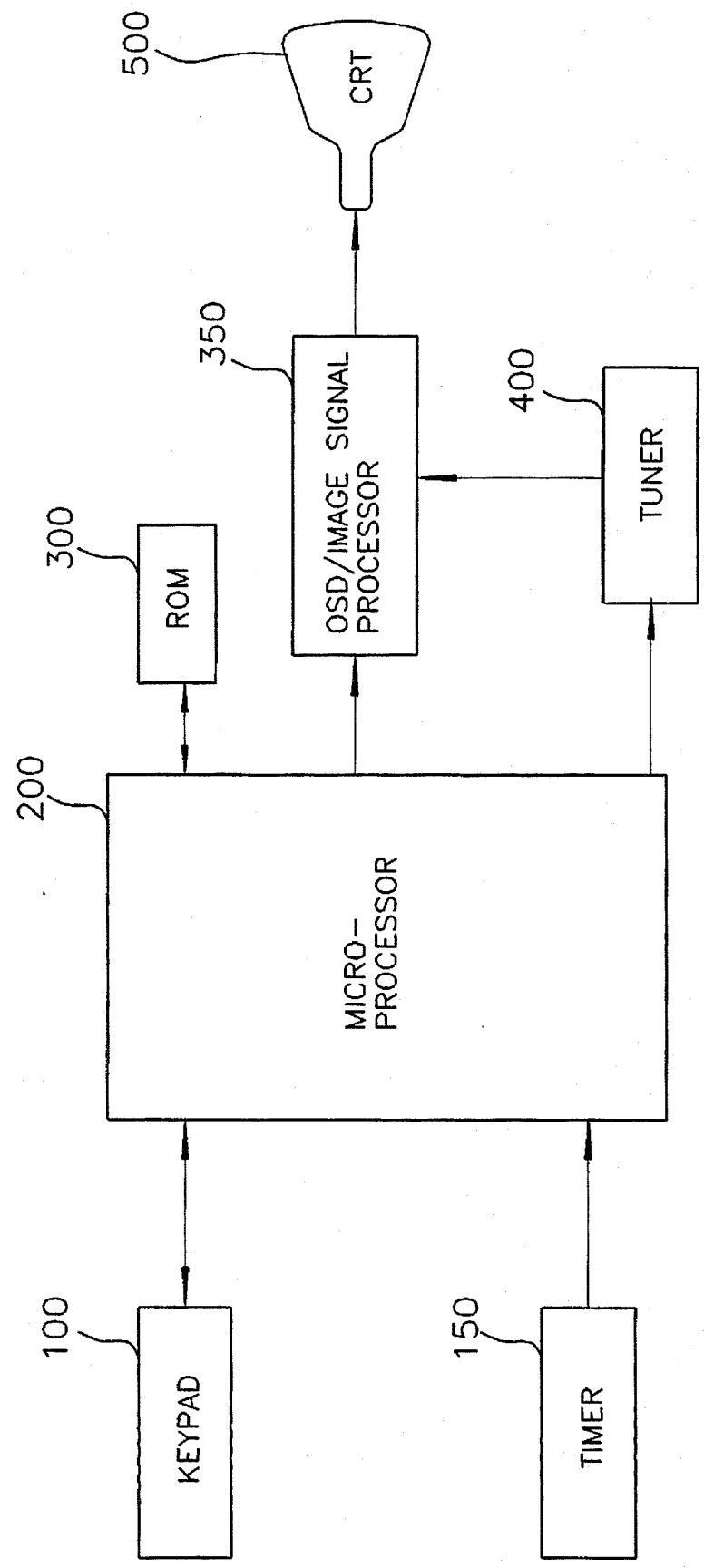
FIG. 1 is a schematic block diagram for illustrating a device for automatic reservation tuning for a broadcasting receiver according to an embodiment of the present invention.
Figure 2:
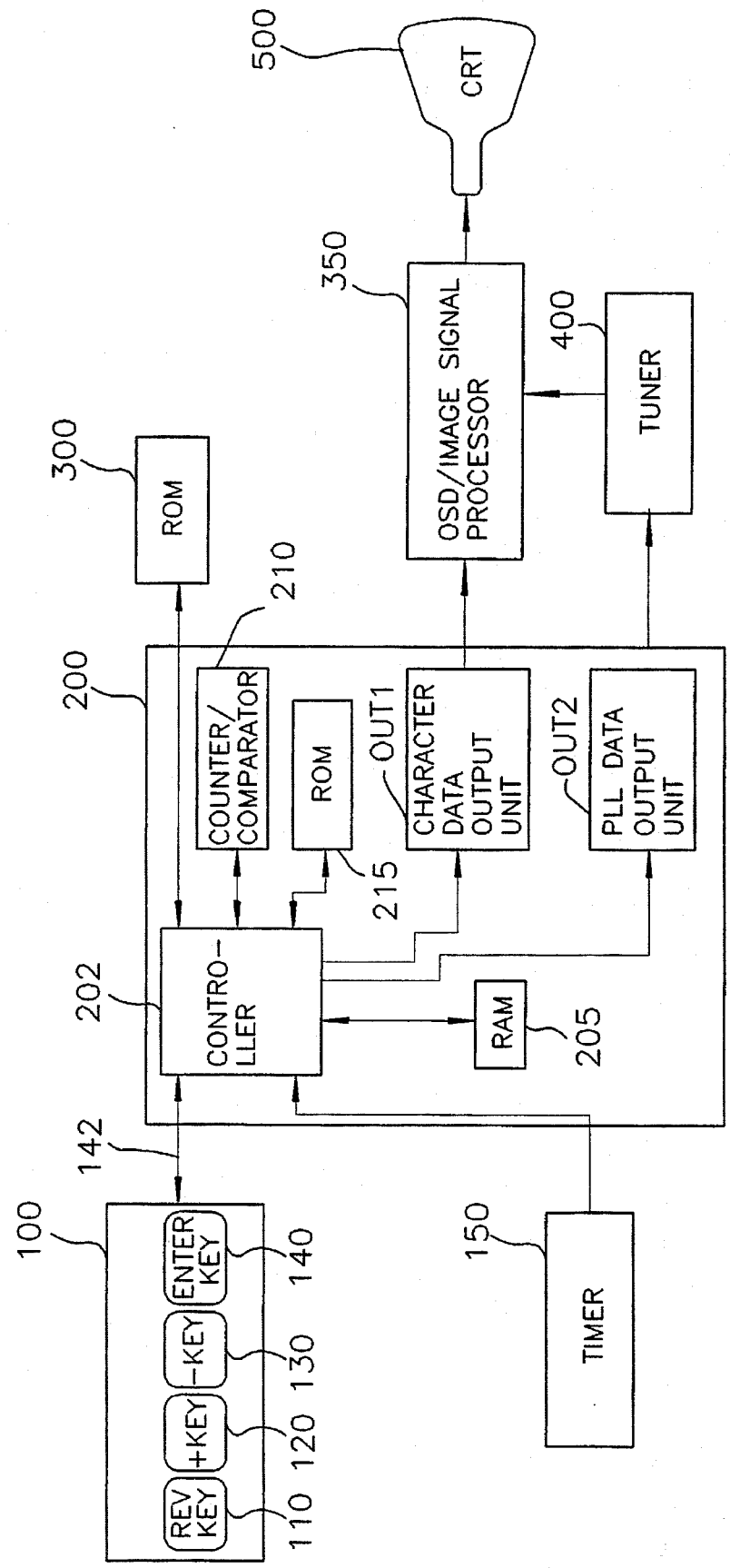
FIG. 2 is a detailed block diagram for illustrating a device for automatic reservation tuning for a broadcasting receiver as shown in FIG. 1.

FIG. 1 is a schematic block diagram for illustrating a device for automatic reservation tuning for a broadcasting receiver according to an embodiment of the present invention. FIG. 2 is a detailed block diagram for illustrating a device for automatic reservation tuning for a broadcasting receiver as shown in FIG. 1. As shown in FIGS. 1 and 2, a microprocessor 200 controls a device for automatic reservation tuning for a broadcasting receiver overall. Output signals of a keypad 100 and a timer 150 are inputted to a controller 202 in microprocessor 200. Controller 202 scans keypad 100 to check whether a key of keypad 100 is pressed or not. If a key of keypad 100 is pressed, an output signal from the key of keypad 100 is inputted to controller 202. Keypad 100 is a device for inputting to controller 202 a desired reservation information such as a date, time, a day of the week and a channel number for a broadcasting program that a viewer desires to watch. Controller 202 inputs to a RAM 205 present information such as the present date, time, day of the week and channel number which are generated from timer 150. A timer employed in the conventional broadcasting receiver such as a television set and the like can be used as timer 150.

Also, while controller 202 is scanning keypad 100, if a key of keypad 100 is pressed, controller 202 outputs through a character data output unit OUP1 to an OSD/image signal processor 350 an OSD character data signal corresponding to characters such as "today", "everyday", "every week" or "given date" and the like stored in a first ROM 300 so that a watching mode selected is identified. Whenever the viewer inputs reservation information through a key of keypad 100, controller 202 outputs an OSD character data signal to OSD image signal processor 350 through character data output unit OUP1 to display reservation information on the CRT screen, so that the viewer can input the reservation information while seeing data displayed on the screen.

Controller 200 stores the reservation information inputted through keypad 100 by the viewer into RAM 205.

To perform automatic reservation tuning for a broadcasting receiver, controller 202 compares the reservation information with the present information, both of which are read out from RAM 205.

If the reservation information is the same as the present information, controller 202 reads out of first ROM 300 phase locked loop (PLL) data conforming to a reserved channel number and outputs the PLL data through PLL data output unit OUP2 to a tuner 400 which is automatically tuned to the reserved channel number.

Figure 3:
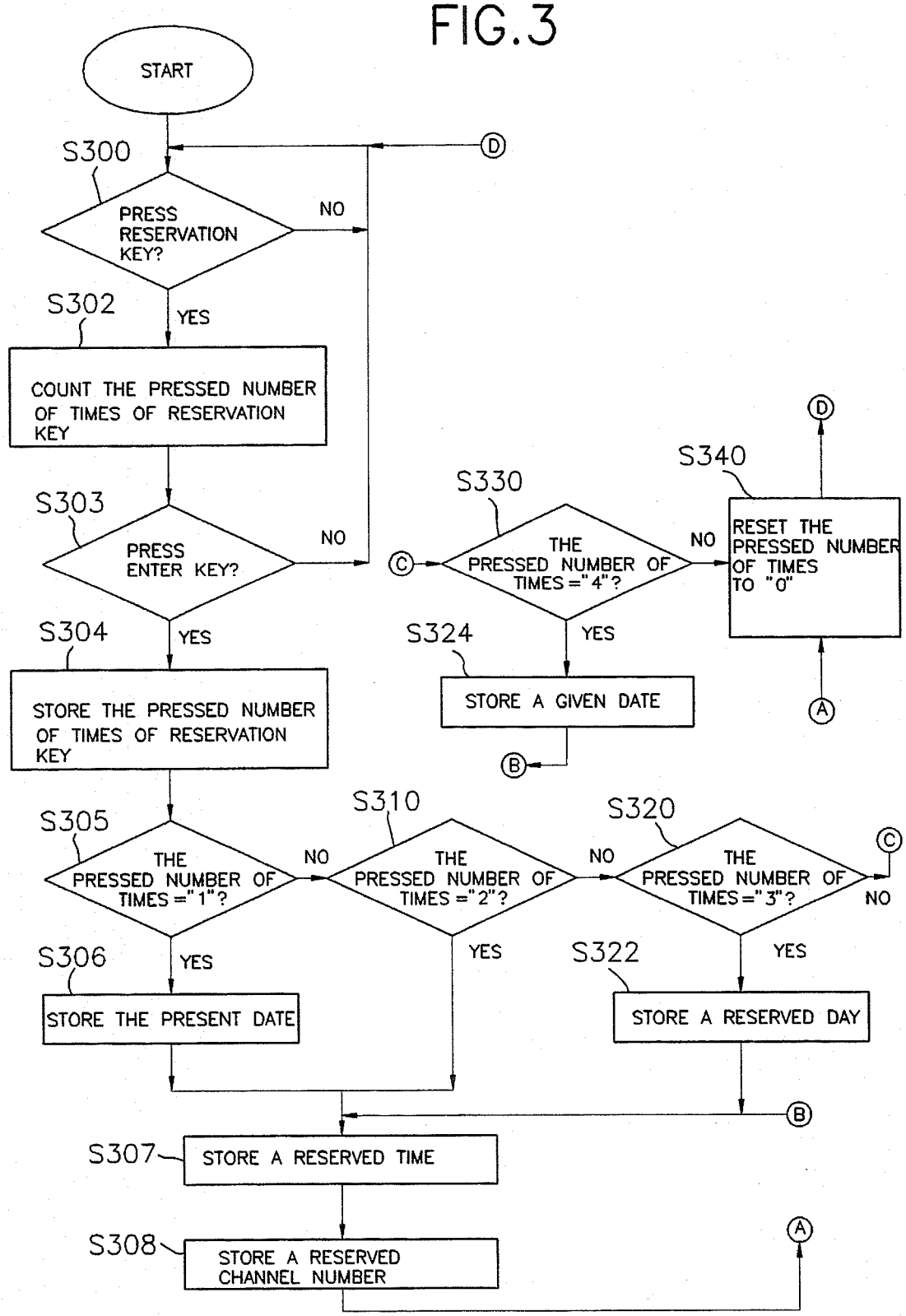
FIG. 3 is a flow chart for explaining reservation processes for a device for automatic reservation tuning for a broadcasting receiver as shown in FIG. 2.

FIG. 3 is a flow chart for explaining reservation processes for a device for automatic reservation tuning for a broadcasting receiver as shown in FIG. 2. There will be described program reservation in a device for automatic reservation tuning for a broadcasting receiver, referring to FIGS. 2 and 3. Keypad 100 comprises a reservation key 110, a plus key 120, a minus key 130 and an enter key 140, all of which are connected in a matrix construction in a general manner. Controller 202 scans keypad 100 whether a key of keypad 100 is pressed or not through an address bus 142.

Timer 150 calculates the present date, time and a day of the week and the like all the time and is a commercially available timer which can be disposed on conventional television sets or video tape recorders and the like. Controller 202 stores into RAM 205 the present information about the present date, time and day of the week inputted from timer 150.

When controller 202 of microprocessor 200 is scanning keypad 100 according to execution of a keypad scan subroutine of a control program stored in itself, if reservation key 110 is pressed, controller 202 increases by 1 a value of counter/comparator 210 which has been reset to "0" (S302) and if reservation key 110 is not pressed, controller 202 continues to scan keypad 100 whether reservation key 110 is pressed or not (step S300).

At that time, controller 202 decides whether there is an input from enter key 140 or not (step S303). If there is an input from enter key 140, controller 202 stores the value of counter/comparator 210 in RAM 205 (step S304) and then compares the value with "1" (step S305). If there is no input from enter key 140, controller 202 continues to scan keypad 100 whether reservation key 110 is pressed or not (step S300). Here, counter/comparator 210 may be an arithmetic logic unit (ALU) constituting an inner structure of microprocessor 200.

If there is an input to controller 202 from enter key 140, controller 202 executes a comparison subroutine of the control program. Namely, if the value of counter/comparator 210, which means the pressed number of times of reservation key 110, is equal to "1", controller 202 reads out data stored in a first address area of ROM 215 and outputs via character data output unit OUP1 to OSD/image signal processor 350 OSD character data signal conforming to characters such as "today" which is stored in first ROM 300, "time" and "channel" which are stored in advance in order in ROM 215. And also, controller 202 reads out the present time and channel number from present information stored in RAM 205 and outputs the corresponding data signal via character data output unit OUP1 to OSD/image signal processor 350. Thus, there are displayed characters such as "today", "time" and "channel" on the screen of CRT 500. An example of character display on the screen is shown in (A) of FIG. 4. Here, a 24 hour time base display system in which 5 p.m. is displayed as "17:00" is used, but a 12 hour time base display system can be used. The "today" means that a program to be broadcasted today will be reserved. When controller 202 reads out the present information from RAM 205 and outputs the present information to OSD/image signal processor 350 through character data output unit OUP1 in order to display present time and channel number on the screen. Character data output part OUP1 flickers the present time display in order to inform the viewer of data available to be inputted at present. At the time, after the present time displayed is set to a desired time by pressing plus key 120 and/or minus key 130 shown in FIG. 2, enter key 140 is pressed for time reservation (step S307). Once the time reservation is finished by pressing enter key 140, the display stops flickering and the desired time is stored in RAM 205. Subsequently, when controller 202 inputs the present channel number stored in RAM 205 to counter/comparator 210 and displays the same to be flickered on the screen, the present channel number is set to a desired channel number by pressing plus key 120 and/or minus key 130 and enter key 140 for a channel number reservation (step S308). Controller 202 stores the reserved channel number in RAM 205. The present date, which is inputted from timer 150 and stored in RAM 205, is stored in RAM 205 as a reserved date by controller 202. Therefore, the pressed number of times of the reservation key 110 date, time and channel number are stored in the first address area of RAM 205 in order. And then controller 202 resets the value (the pressed number of times of conservation key 110) of counter/comparator 210, that is, the pressed number of times of reservation key 110, to "0" and again scans keypad 100.

If the value of counter/comparator 210 is equal to 2 (step S310), controller 202 reads out and displays on the screen of CRT 500 OSD character data corresponding to "everyday" which is stored in first ROM 300, "time" and "channel" stored in ROM 215, and the present time and channel number from the present information stored in RAM 205 through character data output unit OUP1 to OSD/image signal processor 350, as shown in (B) of FIG. 4. The "everyday" means that a program to be broadcasted everyday will be reserved. The everyday watching mode as above needs a channel number and time, not a date, as inputs for a desired program reservation since the program is broadcast everyday. The time and channel number are reserved in the same way as done when the value of counter/comparator 210 is equal to "1" as described above. Therefore, the time reservation is performed at the above step (step S307) and the channel number reservation is performed at the above step (step S308). The value of counter/comparator 210, the reserved time and channel number are stored in the second address area in RAM 205 in order.

If the value of counter/comparator 210 is equal to "3" (step S320), controller 202 reads out and displays on the screen of CRT 500 OSD character data corresponding to "every week" and "day" stored in first ROM 300 and "time" and "channel" stored in ROM 215, and the present time and channel number from the present information stored in RAM 205 through character data output unit OUP1 and OSD/image signal processor 350, as shown in (C) of FIG. 4. The "every week" means that a program to be broadcasted every week is reserved. In order to reserve a desired program to be broadcasted every week, controller 202 inputs the present day from the present information stored in RAM 205 to counter/comparator 210 when controller 202 reads out and outputs the present day to character data output unit OUP1. At the time, the present day of the week is changed to a desired day of the week by manipulating plus key 120 and/or minus key 130 shown in FIG. 2 and the desired day is reserved when enter key 140 is pressed (step S322). The time and channel number are reserved in the same way as done when the value of counter/comparator 210 is equal to "1" as described above. Therefore, the time reservation is performed at the above step (step S307) and the channel number reservation is performed at the above step (step S308).

The value of counter/comparator 210, the reserved day, time and channel number are stored in the third address area in RAM 205 in order.

If the value of counter/comparator 210 is equal to "4" (step S330), controller 202 reads out and displays on the screen of CRT 500 OSD character data corresponding to "given date" stored in first ROM 300, "date", "time" and "channel" stored in ROM 215, and the present time and channel number from the present information stored in RAM 205 through character data output unit OUP1 and OSD/image signal processor 350, as shown in (D) of FIG. 4. The "date" means that a program to be broadcasted on a given date is reserved.

In order to reserve a desired program to be broadcasted on a given date, controller 202 inputs the present date from the present information stored in RAM 205 to counter/comparator 210 when controller 202 reads out and outputs the present date to character data output unit OUP1. At the time, the present date is changed to a given date by manipulating plus key 120 and/or minus key 130 shown in FIG. 2 and the given date is reserved when enter key 140 is pressed (step S324). The time and channel number are reserved in the same way as done when the value of counter/comparator 210 is equal to "1" as described above. Therefore, the time reservation is performed at the above step (step S307) and the channel number reservation is performed at the above step (step S308). The value of counter/comparator 210, the reserved date, time and channel number are stored in the fourth address area in RAM 205 in order.

If the value of counter/comparator 210 is larger than "4", controller 202 resets the value to "0" (S340) and rescans keypad 100 (S300).

Automatic tuning processes will be explained hereinafter in a broadcasting receiver having a device for automatic reservation tuning according to a reservation information stored in RAM 205 as described above.

FIG. 5 is a flow chart for explaining automatic tuning processes for a device for automatic reservation tuning for a broadcasting receiver as shown in FIG. 2.

Microprocessor 200 successively reads out the reservation information from the first address area to the fourth address area in RAM 205 all the time when a viewer is watching a television set (step S550). At first microprocessor 200 checks whether the value of counter/comparator 210 reserved as a piece of reservation information is equal to "1" (step S552), wherein the value is the pressed number of times of reservation key 110 for deciding a viewer's watching mode as described before. If the value is not equal to "1", microprocessor keeps the present channel number. If the value is equal to "1", microprocessor 200 reads out a reserved date successively stored in the first address area of RAM 205 and the present date also stored in RAM 205 from timer 150 and inputs them in counter/comparator 210 for a comparison (S554).

If the present date and the reserved date are not the same, microprocessor 200 keeps the present channel number. If the present date and the reserved date are the same, microprocessor 200 reads out the reserved time also successively stored in the first address area of RAM 205 and the present time also stored in RAM 205 from timer 150 and inputs them in counter/comparator 210 for a comparison (S556). If the reserved time and the present time are not the same, microprocessor 200 keeps the present channel number. If the reserved time and the present time are the same, microprocessor 200 reads out a reserved channel number stored in the first address area of RAM 205 and the present channel number and inputs them in counter/comparator 210 for a comparison (S558). If the reserved channel number and the present channel number are the same, microprocessor 200 keeps the present channel number. If not the same, microprocessor 200 reads out PLL data corresponding to the reserved channel number from ROM 300 and outputs the PLL data to a tuner 400 through PLL data output unit OUP2 (S560), so that tuner 400 is automatically tuned to the reserved channel number. If the value is equal to "2" (S562), microprocessor 200 reads out reserved time and reserved channel number successively stored in the second address area of RAM 205 and the present time and channel number also stored in RAM 205 from timer 150, and inputs them in counter/comparator 210 to perform respective comparisons through the steps (S556, S558 and S560) done when the value is equal to "1", so that tuner 400 is automatically tuned to the reserved channel number.

If the value is equal to "3" (S564), microprocessor 200 reads out a reserved day, time and channel number successively stored in the third address area of RAM 205 and the present day, time, and channel number also stored in RAM 205 from timer 150 and inputs at first the reserved day and the present day in counter/comparator 210 for a comparison (S566). If the two days are not the same, microprocessor 200 keeps the present channel number. If the same, microprocessor 200 performs time and channel number comparisons in counter/comparator 210 through the steps (S556,S558 and S560) done when the value is equal to "1" as described above, so that tuner 400 is automatically tuned to the reserved channel number.

If the value is equal to "4" (S568), microprocessor 200 reads out a reserved given date, time and channel number successively stored in the third address area of RAM 205 and the present date, time, and channel number also stored in RAM 205 from timer 150 and inputs at first the reserved given date and the present date in counter/comparator 210 for a comparison (S570). If the two dates are not the same, microprocessor 200 keeps the present channel number. If the same, microprocessor 200 performs time and channel number comparisons in counter/comparator 210 through the steps (S556,S558 and S560) done when the value is equal to "1" as described above, so that tuner 400 is automatically tuned to the reserved channel number.

If the value is smaller than "1" or larger than "4", microprocessor 200 keeps the present channel number.

Thus, a device for automatic reservation tuning for a broadcasting receiver and a method therefor according to the present invention call provide the viewer with convenience in watching a desired program since tuner 400 can be automatically tuned to a reserved channel number based on the reservation information such as a date, time, a day of the week and a channel number for the desired program.

It is understood that various other modifications will be apparent to and can be readily made by those skilled in the art without departing from the scope and spirit of this invention. Accordingly, it is not intended that the scope of the claims appended thereto be limited to the description as sell forth herein, but rather that the claims be constructed as encompassing all the features of patentable novelty that reside in the present invention, including all features that would be treated as equivalents thereof by those skilled in the art to which this invention pertains.

What is claimed is:

1. A method for automatically tuning a tuner of a broadcasting receiver by PLL data in accordance with reservation information while displaying on a CRT screen present and reservation information inputting to the receiver wherein said reservation information includes a date, time, a day, and a channel number reserved through a reservation input means and said present information includes a present date, time, and a channel number outputting from a timer, comprising the steps of:

scanning a keypad for checking whether a reservation key of said reservation input means is pressed for inputting said reservation information;

counting a pressed number of times whenever said reservation key is pressed to a memory unit;

checking whether an enter key of said reservation input means is pressed;

storing the pressed number of times of said reservation key and said reservation information to said memory unit when said enter key is pressed;

rescanning said reservation input means after setting the value of pressed number of times to a first value when the pressed number of times is smaller than a second value or larger than a fifth value or when said enter key is twice pressed;

inputting said present information from said timer to said memory unit;

displaying on said CRT screen characters about said watching mode and characters about said reservation input items in accordance with said watching mode;

comparing said reservation information and said present information in accordance with said watching mode; and outputting phase locked loop (PLL) data corresponding to said reserved channel number for tuning said tuner when said reserved channel number and a present channel number are different.

2. The method as claimed in claim 1, wherein said step of storing the pressed number of times and said reservation information includes the steps of:

storing in said memory unit a reserved time and channel number, which is a program to be broadcasted today, outputted from said reservation input means and the present date outputted from said timer when said pressed number of times is equal to said first value;

storing in said memory unit the reserved time and channel number, which is a program to be broadcasted everyday, outputted from said reservation input means when the pressed number of times is equal to a second value;

storing in said memory unit a reserved day of the week, time and channel number, which is a program to be broadcasted every week, outputted from said reservation input means when the pressed number of times is equal to a third value; and storing in said memory unit reserved given date, time and channel number, which is a program to be broadcasted on a given date, outputted from said reservation input means when the pressed number of times is equal to a fourth value.

3. The method as claimed in claim 1, wherein said step of outputting said PLL data includes the steps of:

reading out of said memory unit the pressed number of times of a reservation key of said reservation input means and checking the pressed number of times of said reservation key;

reading out of said memory unit said present information and reservation information in accordance with the pressed number of times of said reservation key and comparing said present information and reservation information; and outputting to a tuner PLL data corresponding to a reserved channel number when said present information and reservation information are different.

4. An automatic reservation tuning device for a broadcasting receiver for automatically tuning a tuner of a broadcasting receiver by PLL data in accordance with reservation information while displaying on a CRT screen present and reservation information inputting to the receiver wherein said reservation information includes a date, time, a day, and a channel number, and said present information includes a present date, time, and a channel number outputting from a timer, comprising:

an input unit for inputting to a memory unit information on a plurality of watching modes and said reservation information on a desired program in accordance with a watching mode, wherein said watching mode is a mode for watching a desired program to be broadcasted today, everyday, every week or on a given date and said reservation information includes a date, time, a day of the week;

a character data storing unit for storing character data to be displayed on the CRT screen in accordance with said reservation information on said watching mode when said watching mode is inputted through said input unit, wherein said character data include "date", "time", "day", "today", "everyday", "every week", "channel" and "given date";

a character data output unit for reading out said character data indicating input items from said character data storing unit in accordance with said watching mode selected by said input unit and for outputting character data signals based on said character data to an OSD/image signal processor for displaying said character data on the CRT screen; and PLL data output unit for outputting to said tuner, said PLL data corresponding to a reserved channel number when said present information and reservation information are different.

5. The automatic reservation tuning device as claimed in claim 4, wherein each of said plurality of watching modes is selected by the pressed number of times of a reservation key of said input unit.

6. The automatic reservation tuning device as claimed in claim 4, wherein said input unit comprises said keypad having:

a reservation selection key for selecting said watching mode;

a first key for increasing a date, time, a day of the week and a channel number for reservation information;

a second key for decreasing said date, time, day of the week and channel number for said reservation information; and an enter key for inputting said date, time, day of the week and channel number adjusted for said reservation information.

* * * * *